(12) United States Patent
Oohira

(10) Patent No.: US 8,279,391 B2
(45) Date of Patent: Oct. 2, 2012

(54) LIQUID CRYSTAL DISPLAY DEVICE WITH GROUNDED BY THERMOCOMPRESSION BONDING TAPE AND DOUBLE-SIDE ADHESIVE TAPE

(75) Inventor: Eiji Oohira, Mobara (JP)

(73) Assignees: Hitachi Displays, Ltd., Chiba-ken (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 0 days.

(21) Appl. No.: 13/405,561

(22) Filed: Feb. 27, 2012

(65) Prior Publication Data
US 2012/0162587 A1  Jun. 28, 2012

Related U.S. Application Data

(62) Division of application No. 12/292,133, filed on Nov. 12, 2008, now Pat. No. 8,149,371.

(30) Foreign Application Priority Data

Nov. 14, 2007 (JP) ................................ 2007-295039

(51) Int. Cl.
*G02F 1/1345* (2006.01)
*G02F 1/1335* (2006.01)
*G02F 1/1333* (2006.01)

(52) U.S. Cl. ........... 349/149; 349/152; 349/112; 349/59

(58) Field of Classification Search .................... 349/59, 349/149, 152, 103
See application file for complete search history.

(56) References Cited

U.S. PATENT DOCUMENTS

| 5,717,190 A | 2/1998 | Inoue |
| 5,870,160 A * | 2/1999 | Yanagawa et al. ............ 349/141 |
| 6,313,481 B1 * | 11/2001 | Ohtani et al. ................... 257/59 |
| 6,525,786 B1 | 2/2003 | Ono |
| 6,597,414 B1 | 7/2003 | Hasegawa |
| 7,663,726 B2 | 2/2010 | Takahashi et al. |
| 2007/0080624 A1 | 4/2007 | Koiwa et al. |
| 2008/0137020 A1 * | 6/2008 | Takahashi et al. ............ 349/150 |

FOREIGN PATENT DOCUMENTS

| JP | 61-267081 A | 11/1986 |
| JP | 4-66781 U | 6/1992 |
| JP | 11-149085 | 10/1995 |
| JP | 11-149085 | 6/1999 |

* cited by examiner

*Primary Examiner* — Hoan C Nguyen
(74) *Attorney, Agent, or Firm* — Stites & Harbison, PLLC; Juan Carlos A. Marquez, Esq

(57) ABSTRACT

A liquid crystal display device which can be manufactured at a low cost is provided. The liquid crystal display device includes a TFT substrate, a CF substrate of a size smaller than a size of the TFT substrate, and a liquid crystal layer sandwiched between the TFT substrate and the CF substrate. A ground pad is formed on a portion of the TFT substrate where the CF substrate does not overlap with the TFT substrate. A transparent conductive film is formed on an upper surface of the CF substrate. The transparent conductive film of the CF substrate and the ground pad formed on the TFT substrate are electrically connected with each other via a thermocompression bonding conductive tape. A double-sided adhesive tape is arranged between the thermocompression bonding conductive tape and an upper surface of the CF substrate and between the thermocompression bonding conductive tape and the TFT substrate.

7 Claims, 9 Drawing Sheets

FIG. 13
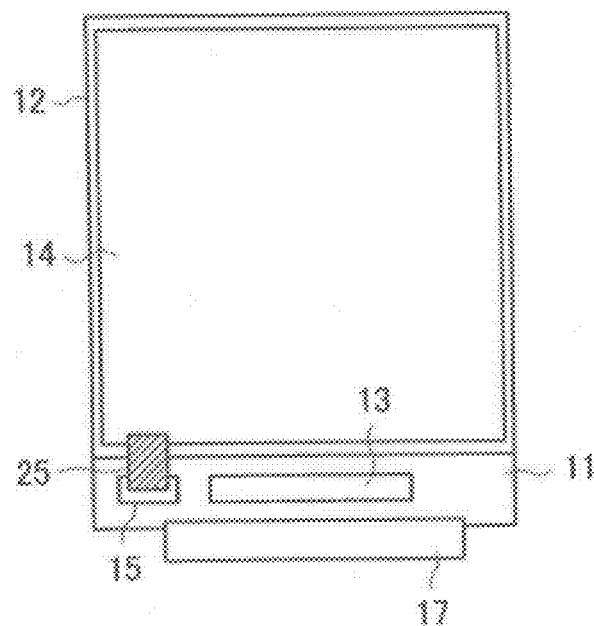
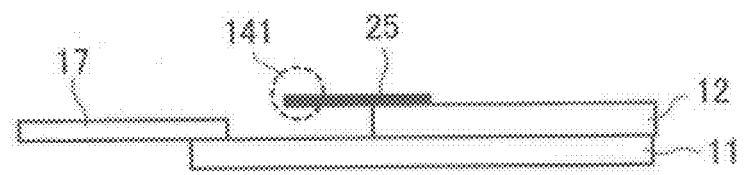
FIG. 14A
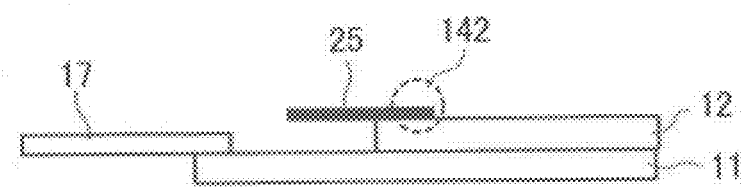
FIG. 14B
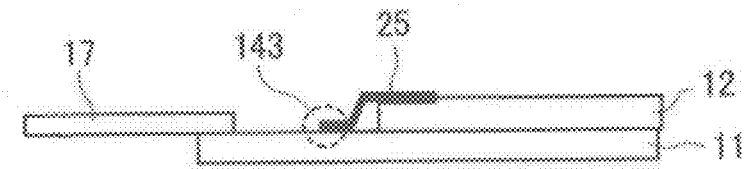
FIG. 14C

LIQUID CRYSTAL DISPLAY DEVICE WITH GROUNDED BY THERMOCOMPRESSION BONDING TAPE AND DOUBLE-SIDE ADHESIVE TAPE

CROSS-REFERENCE TO RELATED APPLICATIONS

The present application is a Divisional of U.S. application Ser. No. 12/292,133 filed on Nov. 12, 2008. Priority is claimed based on U.S. application Ser. No. 12/292,133 filed on Nov. 12, 2008, which claims the priority of Japanese Application No. 2007-295039 filed Nov. 14, 2007, all of which is incorporated herein by reference in its entirety.

BACKGROUND

1. Field of the Invention

The present invention relates to a liquid crystal display device, and more particularly to an IPS-method liquid crystal display device which uses a thermocompression bonding conductive tape.

2. Description of the Related Art

FIG. 10 is a perspective view showing the whole constitution of a conventional liquid crystal display device.

A TFT substrate 11 and a color filter substrate 12 are made to overlap with each other with a liquid crystal layer sandwiched therebetween thus constituting a liquid crystal display panel. When an IPS-method liquid crystal display panel is used as such a liquid crystal display panel, common electrodes are not arranged on a color filter substrate side and hence, the color filter substrate is charged with static electricity. In the IPS-method liquid crystal display device, for releasing the charged static electricity, a transparent conductive film 14 made of ITO or the like is arranged on an upper surface (a surface on a side opposite to a side on which the liquid crystal layer is arranged) of the color filter substrate 12, and for grounding the transparent conductive film 14, a ground pad 15 is formed or arranged on a portion of the TFT substrate 11 where the TFT substrate 11 does not overlap with the color filter substrate 12, and the transparent conductive film 14 and the ground pad 15 are electrically connected with each other using a conductive resin 16.

Further, on a portion of the TFT substrate 11 where the color filter substrate 12 does not overlap with the TFT substrate 11, a driver chip 13 for controlling the driving of the liquid crystal display panel is formed. Further, a flexible printed circuit board 17 is arranged on the TFT substrate 11 for supplying a signal to the driver chip 13.

Here, the liquid crystal display panel is arranged above a frame-shaped mold frame 18, and one end of the above-mentioned flexible printed circuit board 17, a group of optical sheets not shown in the drawings, and a light guide plate 19 are arranged below the mold frame 18. Here, an LED light source 20 is arranged on one end of the flexible printed circuit board in a state that the LED light source 20 faces a side surface of the light guide plate 19 in an opposed manner. Further, a reflection sheet not shown in the drawing is arranged below the light guide plate 19.

As a known technique, Japanese Patent Laid-Open Hei11-149085 (patent document 1) discloses a technique in which a transparent conductive film is formed on a color filter substrate of an IPS-method liquid crystal display device.

SUMMARY

FIG. 11 is a side view showing the constitution of a conventional liquid crystal display device which is explained in conjunction with FIG. 10.

In FIG. 11, the TFT substrate 11 and the color filter substrate 12 are arranged to face each other in an opposed manner with the liquid crystal layer sandwiched therebetween in a region which is surrounded by a sealing material 21. The TFT substrate 11 includes a region where a driver chip 13 which controls the driving of the liquid crystal display device is mounted and hence, the TFT substrate 11 is made larger than the color filter substrate 12 in size.

Here, in FIG. 11, numeral 22 indicates the group of optical sheets not shown in FIG. 10 which is constituted of an upper diffusion sheet, an upper prism sheet, a lower prism sheet, a lower diffusion sheet and the like, and numeral 23 indicates a reflection sheet which is arranged below the light guide plate 19 and is adhered to the mold frame 18 using a double-sided adhesive tape or the like.

As shown in FIG. 10 and FIG. 11, there may be a case in which the conductive resin 16 is used for connecting the transparent conductive film 14 and the ground pad 15. However, it is difficult to decrease a height of the conductive resin 16 after applying the conductive resin and hence, the process management at the time of the mass-production of the liquid crystal display devices becomes a problem. To overcome such a problem, the use of a thermocompression bonding conductive tape in place of the conductive resin has been proposed recently.

FIG. 12 shows the constitution which uses a thermocompression bonding conductive tape 25 for connecting the transparent conductive film 14 and the ground pad 15. In FIG. 12, the constitution of the liquid crystal display device is substantially equal to the constitution of the liquid crystal display device shown in FIG. 10 except for such a connection. Further, FIG. 13 is a top plan view of the constitution shown in FIG. 12.

Here, an actual mounting method of the thermocompression bonding conductive tape 25 which is used for connecting the transparent conductive film 14 and the ground pad 15 shown in FIG. 12 and FIG. 13 is explained in conjunction with FIG. 14A to FIG. 14C.

FIG. 14A shows a state in which the thermocompression bonding conductive tape 25 is arranged to be in contact with the transparent conductive film formed on the color filter substrate 12.

When heat is applied to the thermocompression bonding conductive tape in a state that a lamination position of the thermocompression bonding conductive tape becomes irregular and an end portion of the thermocompression bonding conductive tape is brought into contact with a polarizer, there arises a drawback that the polarizer is thermally degenerated. Accordingly, as shown in FIG. 14A, it is necessary to hold a portion 141 of the thermocompression bonding conductive film tape with tweezers until heat and pressure are applied to the thermocompression bonding conductive tape, for example.

Next, as shown in FIG. 14B, by applying heat and pressure to a portion 142 of the thermocompression bonding conductive tape 25, the portion 142 is adhered to the transparent conductive film and the glass substrate which is used as the color filter substrate.

Further, as shown in FIG. 14C, by applying heat and pressure to a portion 143 of the thermocompression bonding conductive tape 25, the portion 143 is adhered to the ground pad and the glass substrate which is used as the TFT substrate.

Such an operation which requires time and efforts becomes necessary because of a fact that the thermocompression bonding conductive tape 25 does not have an adhesion strength at a room temperature. That is, a thickness of the color filter substrate 12 and a lamination position of the thermocompression bonding conductive tape 25 or the like differ depending on kinds of liquid crystal display panels and hence, a series of such operations must be performed manually. Accordingly, such a manual operation cannot improve production efficiency sufficiently thus giving rise to a drawback that the mass-production of the liquid crystal display panels becomes extremely costly.

The present invention has been made to overcome the above-mentioned drawback and it is an object of the present invention to provide the constitution which realizes the manufacture of a liquid crystal display device at a low cost.

As described above, the thermocompression bonding conductive tape does not generate the adhesiveness at a room temperature and hence, the simple use of the thermocompression bonding conductive tape has a drawback in mass productivity.

Inventors of the present invention have made efforts to find out a means which can realize a liquid crystal display device at a low cost and have arrived at the present invention.

According to a first aspect of the present invention, there is provided a liquid crystal display device which includes a TFT substrate, a color filter substrate of a size smaller than a size of the TFT substrate, and a liquid crystal layer which is sandwiched between the TFT substrate and the color filter substrate, wherein a ground pad is formed on a portion of the TFT substrate where the color filter substrate does not overlap with the TFT substrate, a transparent conductive film is formed on an upper surface of the color filter substrate, the transparent conductive film of the color filter substrate and the ground pad formed on the TFT substrate are electrically connected with each other via a thermocompression bonding conductive tape; and a double-sided adhesive tape is arranged between the thermocompression bonding conductive tape and an upper surface of the color filter substrate and between the thermocompression bonding conductive tape and the TFT substrate.

According to such an aspect of the present invention, it is possible to provide a liquid crystal display device which can be manufactured at a low cost.

Further, the present invention is also characterized in that, in the above-mentioned constitution, the double-sided adhesive tape is continuously arranged over a region ranging from an upper surface of the color filter to the TFT substrate.

Further, the present invention is also characterized in that, in the above-mentioned constitution, the double-sided adhesive tape is continuously arranged over a region ranging from the upper surface of the color filter substrate to the TFT substrate along one side of the thermocompression bonding conductive tape.

Further, the present invention is also characterized in that, in the above-mentioned constitution, the double-sided adhesive tape is continuously arranged over a region ranging from the upper surface of the color filter substrate to the TFT substrate along two opposing sides of the thermocompression bonding conductive tape.

According to another aspect of the present invention, there is provided a liquid crystal display device having an IPS-method liquid crystal display panel, wherein the liquid crystal display panel is formed of a pair of substrates consisting of one large substrate and one small substrate and a liquid crystal layer sandwiched between the pair of substrates, a transparent conductive film is formed on a surface of the small substrate of the liquid crystal display panel on a side opposite to a surface of the small substrate on which the liquid crystal layer is arranged, a ground pad is arranged on a region of the large substrate of the liquid crystal display panel where the large substrate does not overlap with the small substrate, and the transparent conductive film and the ground pad are connected with each other using a thermocompression bonding conductive tape, and a double-sided adhesive tape is arranged between the thermocompression bonding conductive tape and the large substrate or between the thermocompression bonding conductive tape and the small substrate.

Here, the thermocompression bonding conductive tape 25 which is applicable to the present invention has a property which allows the thermocompression bonding conductive tape 25 to be adhered to an object and is cured by applying heat (for example, approximately 140° C. although not limited to 140° C.) and does not possess an adhesion strength at a room temperature.

According to the present invention, it is possible to provide a liquid crystal display device which can be manufactured at a low cost.

BRIEF DESCRIPTION OF THE DRAWINGS

FIG. 13 is a top plan view showing the constitution in FIG. 12; and

FIG. 14A to FIG. 14C are views showing an actual mounting method of the thermocompression bonding conductive tape when the thermocompression bonding conductive tape is used for connecting the transparent conductive film and the ground pad shown in FIG. 12 and FIG. 13.

DETAILED DESCRIPTION OF THE INVENTION

Hereinafter, the present invention is explained in detail in conjunction with drawings.

Embodiment 1

Figure 1:
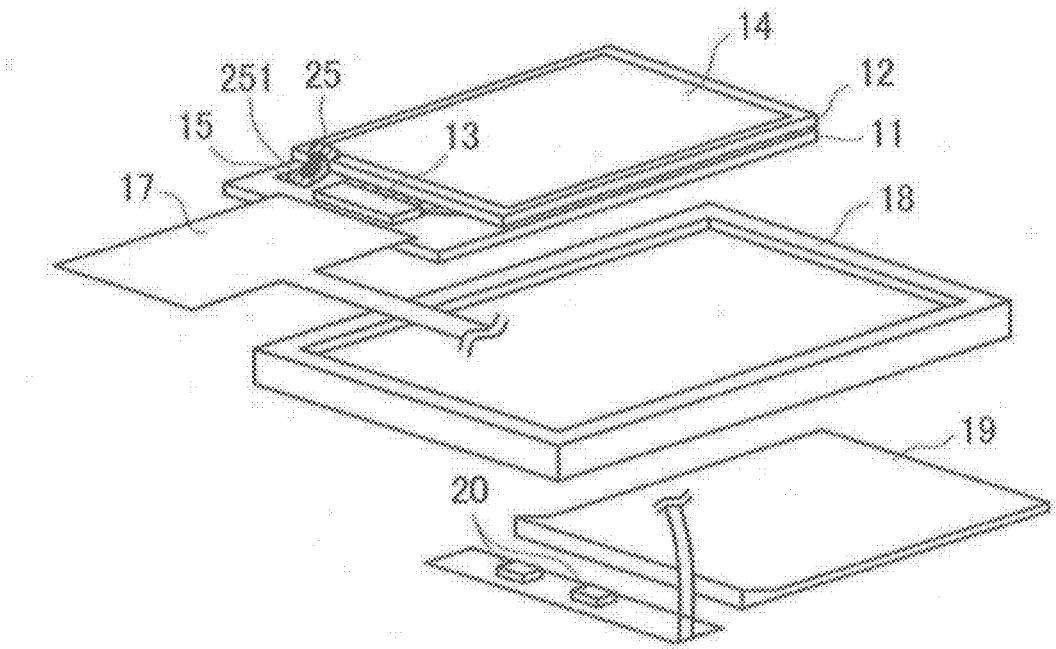
FIG. 1 is a perspective view showing the constitution of a liquid crystal display device of an embodiment 1 according to the present invention.

FIG. 1 is a perspective view showing the constitution of a liquid crystal display device of an embodiment 1 of the present invention.

Figure 10:
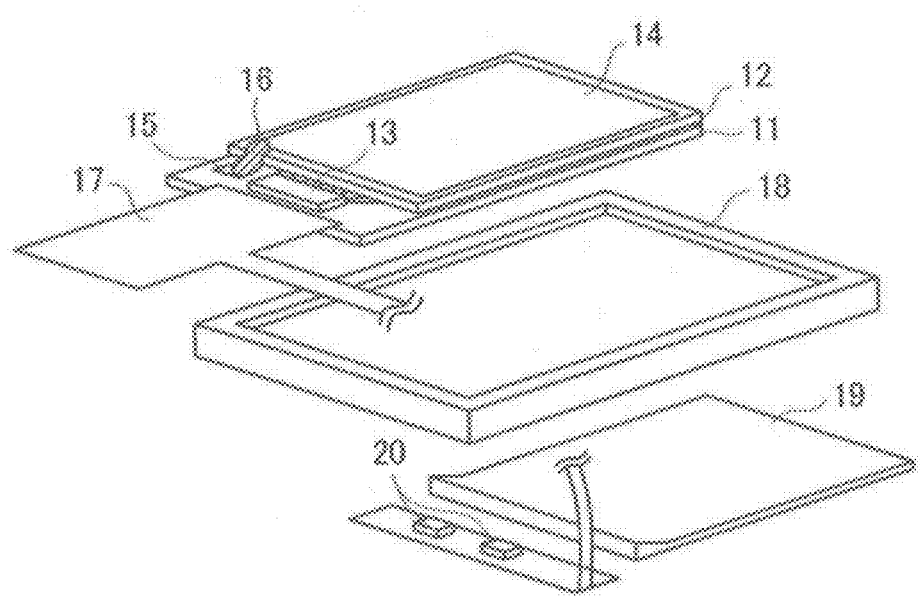
FIG. 10 is a perspective view showing the whole constitution of a conventional liquid crystal display device.
Figure 11:
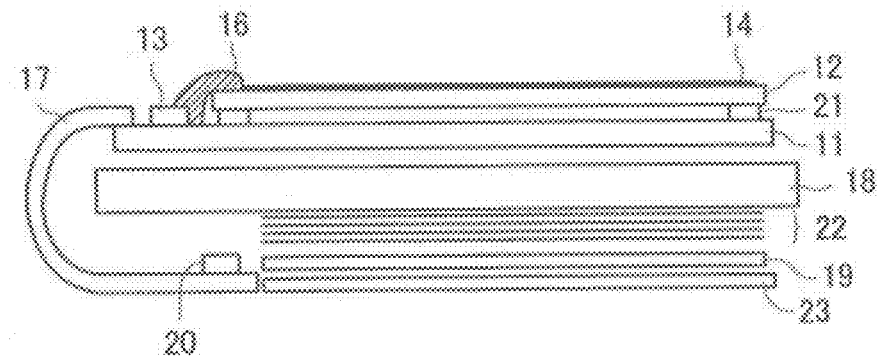
FIG. 11 is a side view showing the constitution of the conventional liquid crystal display device explained in conjunction with FIG. 10.
Figure 12:
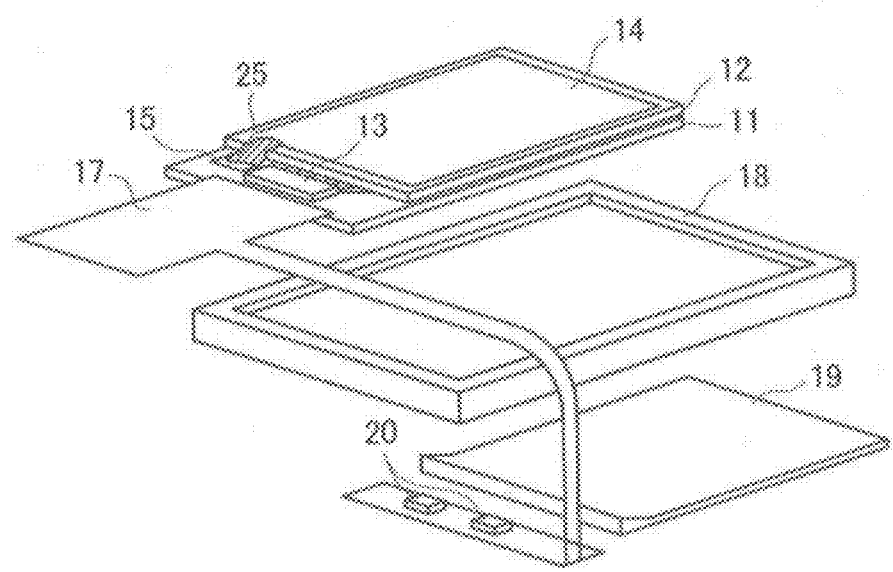
FIG. 12 is a view showing the constitution of the liquid crystal display device in which the thermocompression bonding conductive tape is used for connecting the transparent conductive film and the ground pad.

In the embodiment 1 explained hereinafter, parts other than parts which constitute technical features of the present invention are substantially equal to the parts explained in conjunction with FIG. 10 unless otherwise specified.

Figure 2:
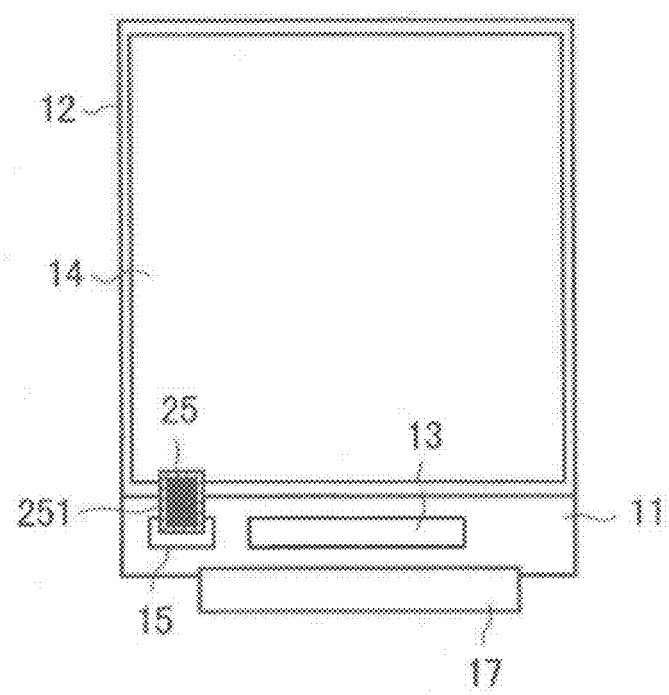
FIG. 2 is a top plan view of the liquid crystal display device of the embodiment 1 as shown in FIG. 1.

The constitution of the liquid crystal display device of the embodiment 1 is characterized as follows. A transparent conductive film 14 and a ground pad 15 formed on the TFT substrate 11 are connected with each other using a thermocompression bonding conductive tape 25. Here, the thermocompression bonding conductive tape 25 is covered with an adhesive film 251 (for example, polyimide-based one-sided adhesive tape or the like) which is one size larger than the thermocompression bonding conductive tape 25 so as to temporarily fix the thermocompression bonding conductive tape 25. FIG. 2 is a top plan view of the liquid crystal display device of the embodiment 1 shown in FIG. 1.

Here, in FIG. 1 and FIG. 2, to facilitate the understanding of the invention, the thermocompression bonding conductive tape 25 is formed on the film 251. However, in the actual arrangement of these parts, the thermocompression bonding conductive tape 25 is covered with the film 251 and hence, the thermocompression bonding conductive tape 25 is formed below the film 251.

Figure 3A:
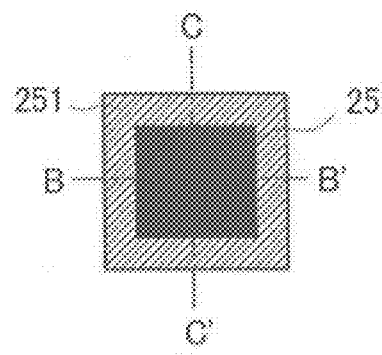
FIG. 3A to FIG. 3C are views for explaining a positional relationship between a thermocompression bonding conductive tape and a film of the embodiment 1.
Figure 3B:
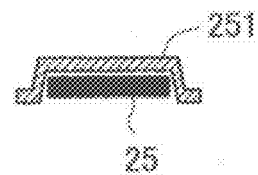
Figure 3C:
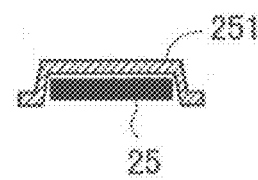

FIG. 3A to FIG. 3C are views for explaining a positional relationship between the thermocompression bonding conductive tape 25 and the film 251 of the embodiment 1.

FIG. 3A is a view corresponding to FIG. 1 and FIG. 2 and shows the positional relationship between the thermocompression bonding conductive tape 25 and the film 251. Further, FIG. 3B is a cross-sectional view taken along a line B-B' in FIG. 3A, and FIG. 3C is a cross-sectional view taken along a line C-C' in FIG. 3A.

As shown in FIG. 3B and FIG. 3C, the thermocompression bonding conductive tape 25 is temporarily fixed by covering the whole thermocompression bonding conductive tape 25 with the adhesive film 251 one size larger than the thermocompression bonding conductive tape 25.

In conjunction with FIG. 4 and FIG. 5, the explanation is made with respect to a method of connecting the thermocompression bonding conductive tape 25 with the transparent conductive film 14 and the ground pad 15 by laminating the film 251 to the thermocompression bonding conductive tape 25 and by applying heat and pressure to the thermocompression bonding conductive tape 25.

Figure 4A:
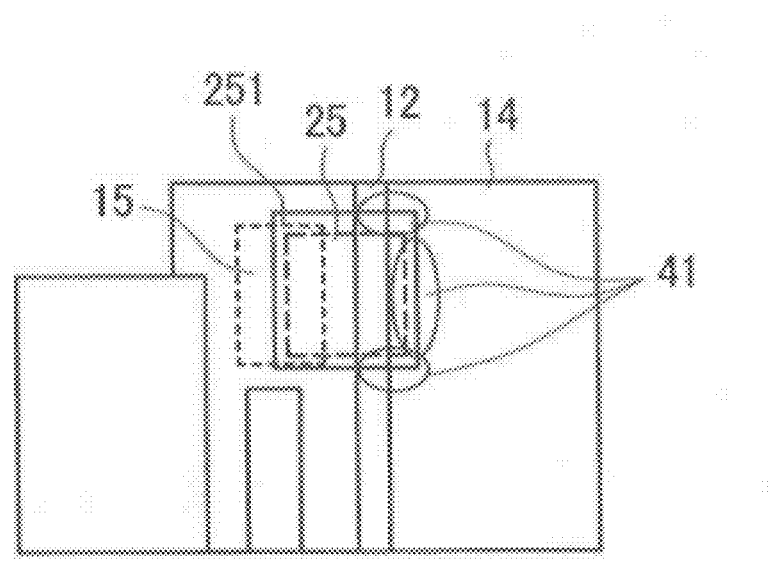
FIG. 4A and FIG. 4B are views for explaining a method of connecting the thermocompression bonding conductive tape with a transparent conductive film and a ground pad by laminating the film to the thermocompression bonding conductive tape and by applying heat and pressure to the film.
Figure 4B:
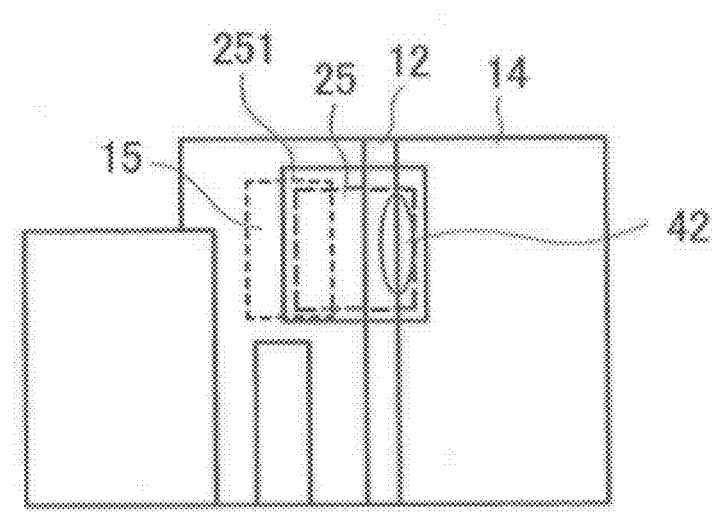
Figure 5A:
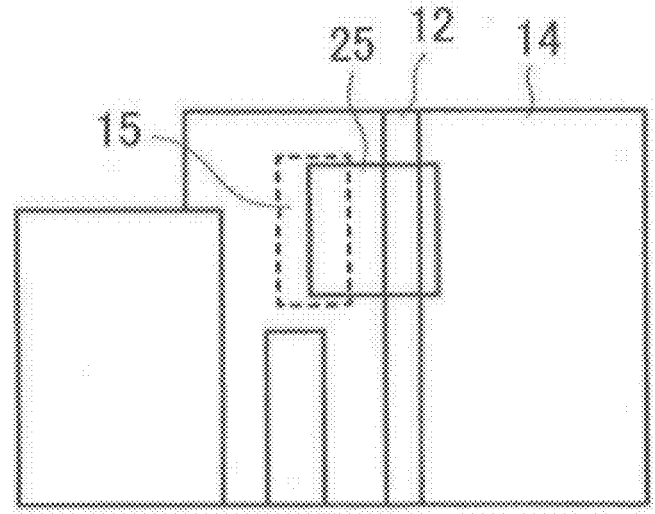
FIG. 5A and FIG. 5B are views for explaining a method of connecting the thermocompression bonding conductive tape with the transparent conductive film and the ground pad by laminating the film to the thermocompression bonding conductive tape and by applying heat and pressure to the film.
Figure 5B:
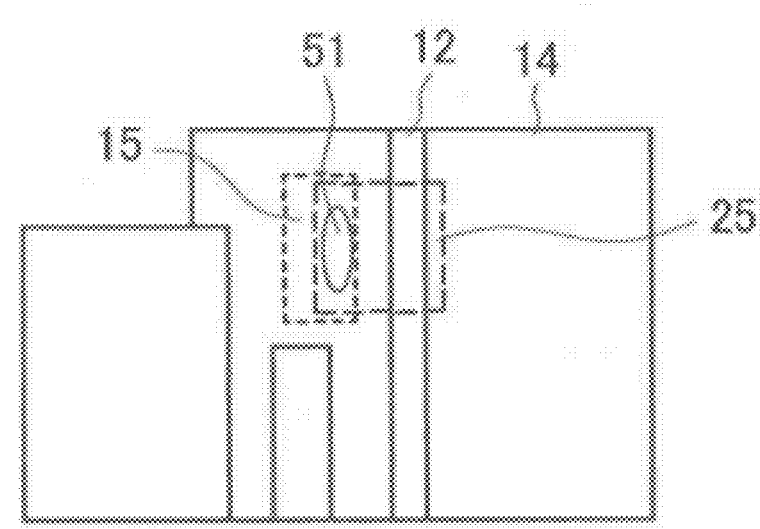

First of all, as shown in FIG. 4A, the thermocompression bonding conductive tape 25 is covered with the film 251 from above and portions 41 of the film 251 are temporarily fixed. Next, as shown in FIG. 4B, by applying heat and pressure to the thermocompression bonding conductive tape 25 at a position 42 from above the film 251, the thermocompression bonding conductive tape 25 and the transparent conductive film 14 are connected with each other. In such a state, the film 251 is peeled off as shown in FIG. 5A and, finally, the thermocompression bonding conductive tape 25 and the ground pad 15 are connected with each other by applying heat and pressure to a portion 51 of the thermocompression bonding conductive tape 25 as shown in FIG. 5B.

Here, in this embodiment, heat and pressure are applied from above the film 251 as described above and hence, as the film 251, this embodiment uses a film which possesses heat resistance and adhesiveness on a side thereof which faces the ground pad 15 and the transparent conductive film 14.

Thereafter, the film 251 is peeled off. This operation is performed for preventing the occurrence of side effects including a following side effect. That is, when the film 251 is held on the thermocompression bonding conductive tape 25, a protective material which is applied to a periphery of the driver chip 13 by coating impregnates into a polarizer by way of the film 251 due to a capillary phenomenon and, thereafter, reaches an upper surface of the polarizer.

According to the present invention, it is possible to temporarily fix the thermocompression bonding material which does not generate an adhesive strength unless heat and pressure are applied thereto.

Embodiment 2

In the embodiment 1, the explanation has been made with respect to the method of temporarily fixing the thermocompression bonding conductive tape using the film. In this case, however, there arises a different drawback that the additional film becomes necessary and hence, a member used as the film is expensive, and an additional operation for peeling off the adhesive film becomes necessary.

Here, in the embodiment 2, the explanation is made with respect to a liquid crystal display device which can be manufactured at a lower cost compared to the liquid crystal display device of the embodiment 1.

Figure 6:
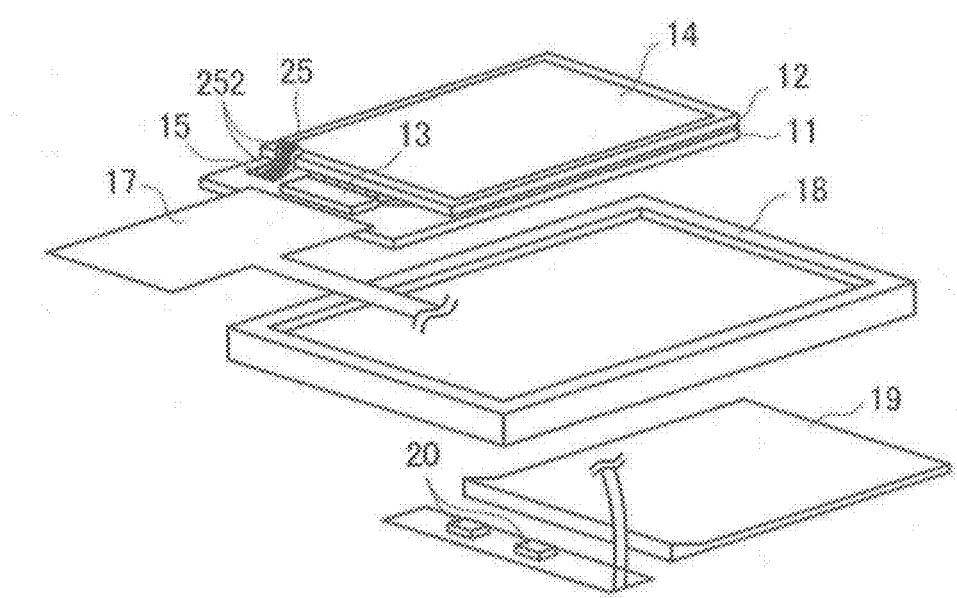
FIG. 6 is a perspective view showing the constitution of a liquid crystal display device of an embodiment 2 according to the present invention.

FIG. 6 is a perspective view showing the constitution of the liquid crystal display device of the embodiment 2 of the present invention.

In the embodiment 2 explained hereinafter, parts other than the parts which constitute the technical features of this embodiment are substantially equal to the parts explained in conjunction with FIG. 10 unless otherwise specified.

Figure 7:
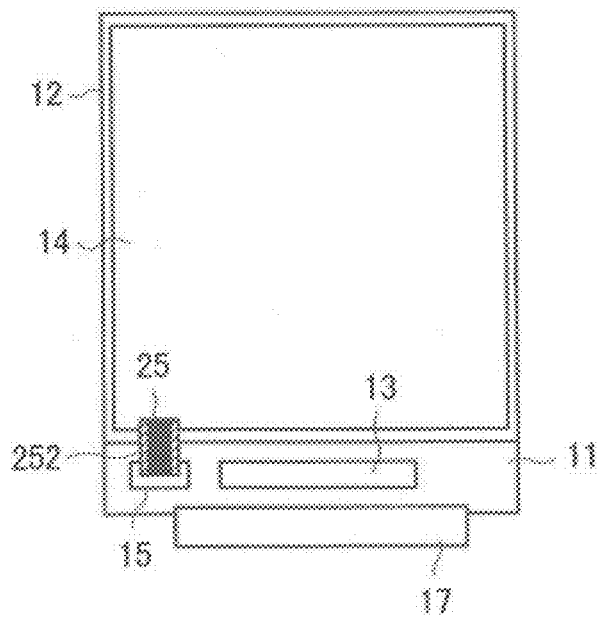
FIG. 7 is a top plan view of the liquid crystal display device of the embodiment 2 as shown in FIG. 6.

The constitution of the liquid crystal display device of the embodiment 2 is characterized in that a transparent conductive film 14 and a ground pad 15 formed on a TFT substrate 11 are connected with each other using a thermocompression bonding conductive tape 25, and a temporarily-fixing-use double-sided adhesive tape is arranged on two sides of a lower surface of the thermocompression bonding conductive tape 25 at the time of performing such a connection operation. FIG. 7 is a top plan view of the liquid crystal display device of the embodiment 2 shown in FIG. 6.

Here, in FIG. 6 and FIG. 7, to facilitate the understanding of the invention, the double-sided adhesive tape 252 is formed on the thermocompression bonding conductive tape 25. However, in the actual arrangement of these parts, the double-sided adhesive tape 252 is formed below the thermocompression bonding conductive tape 25.

Figure 8A:
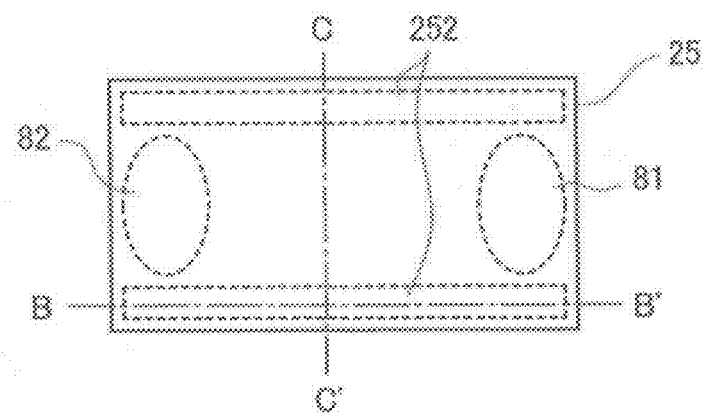
FIG. 8A to FIG. 8C are views for explaining a positional relationship between a thermocompression bonding conductive tape and a double-sided adhesive tape of the embodiment 2.
Figure 8B:
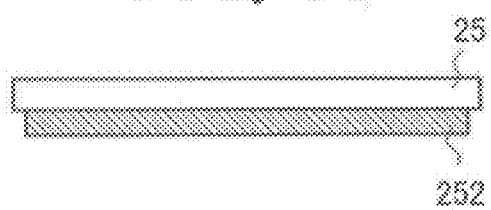
Figure 8C:
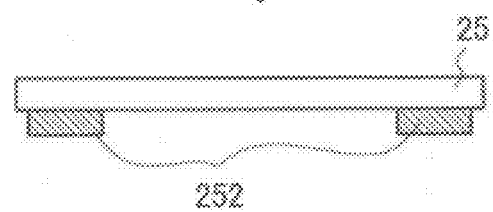

FIG. 8A to FIG. 8C are views for explaining a positional relationship between the thermocompression bonding conductive tape 25 and the double-sided adhesive tapes 252 of the embodiment 2.

FIG. 8A is the view corresponding to FIG. 6 and FIG. 7 and shows the positional relationship between the thermocompression bonding conductive tape 25 and the double-sided adhesive tapes 252. Further, FIG. 8B is a cross-sectional view taken along a line B-B' in FIG. 8A and FIG. 8C is a cross-sectional view taken along a line C-C' in FIG. 8A.

As shown in FIG. 8B and FIG. 8C, the double-sided adhesive tape 252 is adhered to two opposing sides of a lower side of the thermocompression bonding conductive tape 25 thus temporarily fixing the thermocompression bonding conductive tape 25 using the double-sided adhesive tape 252. In the case of the embodiment 2, after temporarily fixing the thermocompression bonding conductive tape 25, heat and pressure are applied to a portion 81 shown in FIG. 8A so as to connect the thermocompression bonding conductive tape 25 and the transparent conductive film 14 with each other. Then, heat and pressure are further applied to a portion 82 so as to connect the thermocompression bonding conductive tape 25 and the ground pad 15 with each other.

In this embodiment, heat and pressure are applied to the thermocompression bonding conductive tape 25 from above the film 251 as described above and hence, as the film 252, this embodiment uses a film which possesses heat resistance and also possesses adhesiveness on a side thereof which faces the ground pad 15 and the transparent conductive film 14.

According to this embodiment, different from the related art, it is unnecessary to hold the thermocompression bonding conductive tape with tweezers or the like. Further, the combination of the thermocompression bonding conductive tape and the heat-resistance adhesive tape explained in conjunction with the embodiment 1 is also unnecessary.

Here, the double-sided adhesive tape which is used in this embodiment may cause a trouble in the electrical connection in thermocompression bonding and also may contaminate a thermocompression bonding heater portion. Accordingly, a thermocompression bonding head is configured to apply a pressure to the thermocompression bonding conductive tape while avoiding the double-sided-adhesive-tape applied portions.

Figure 9:
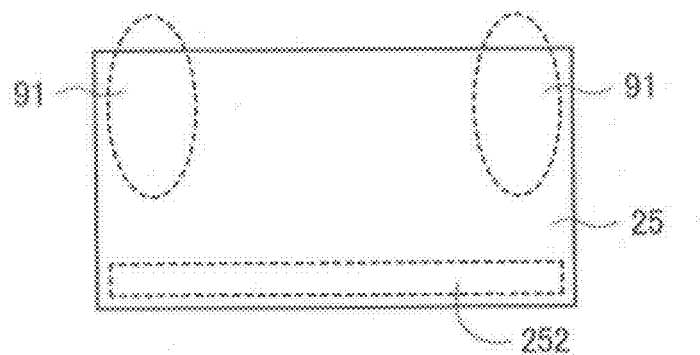
FIG. 9 is a view showing a modification of the liquid crystal display device of the embodiment 2.

Here, when a screen size of the liquid crystal display panel is small or when it is necessary to ensure tolerance with respect to a pressure applying region at the time of performing the thermocompression bonding, the double-sided adhesive tape may be arranged on one side of the thermocompression bonding conductive tape as shown in FIG. 9 in place of the case shown in FIG. 6 to FIG. 8 in which the double-sided adhesive tape is adhered to two opposing sides of the thermocompression bonding conductive tape. By arranging the double-sided adhesive tape on only one side of the thermocompression bonding conductive tape in this manner, it is possible to connect the thermocompression bonding conductive tape 25 with the transparent conductive film 14 and the ground pad 15 by applying heat and pressure to portions 91 of the thermocompression bonding conductive tape 25 shown in FIG. 9. Accordingly, it is possible to apply pressure to one side of the thermocompression bonding conductive tape 25 where the double-sided adhesive tape is not arranged without taking the contamination of the heater portion or the like into consideration thus reducing a width of the thermocompression bonding conductive tape. This enables the application of the present invention to an LCD panel having a small screen size.

The invention claimed is:

1. A liquid crystal display device having an IPS-method liquid crystal display panel, wherein
    the liquid crystal display panel is formed of a pair of substrates consisting of one large substrate and one small substrate and a liquid crystal layer sandwiched between the pair of substrates,
    a transparent conductive film is formed on a surface of the small substrate of the liquid crystal display panel on a side opposite to a surface of the small substrate on which the liquid crystal layer is arranged,
    a ground pad is arranged on a region of the large substrate of the liquid crystal display panel where the large substrate does not overlap with the small substrate, and
    the transparent conductive film and the ground pad are connected with each other using a thermocompression bonding conductive tape, and a double-sided adhesive tape is arranged between, the thermocompression bonding conductive tape and the large substrate or between the thermocompression bonding conductive tape and the small substrate.

2. A liquid crystal display device according to claim 1, wherein the double-sided adhesive tape is arranged along one side of the thermocompression bonding conductive tape.

3. A liquid crystal display device according to claim 1, wherein the double-sided adhesive tape is arranged along two opposing sides of the thermocompression bonding conductive tape.

4. A liquid crystal display device having an IPS-method liquid crystal display panel, wherein
    the liquid crystal display panel is formed of a pair of substrates consisting of one large substrate and one small substrate and a liquid crystal layer sandwiched between the pair of substrates,
    a transparent conductive film is formed on a surface of the small substrate of the liquid crystal display panel on a side opposite to a surface of the small substrate on which the liquid crystal layer is arranged,
    a ground pad is arranged on a region of the large substrate of the liquid crystal display panel where the large substrate does not overlap with the small substrate, and
    the transparent conductive film and the ground pad are connected with each other using a thermocompression bonding conductive tape, and a double-sided adhesive tape is continuously arranged between the thermocompression bonding conductive tape and the large substrate and between the thermocompression bonding conductive tape and the small substrate.

5. A liquid crystal display device according to claim 4, wherein the double-sided adhesive tape is continuously arranged over a region ranging from an upper surface of the small substrate to the large substrate.

6. A liquid crystal display device according to claim 1, wherein the double-sided adhesive tape is continuously arranged over a region ranging from the upper surface of the small substrate to the large substrate along one side of the thermocompression bonding conductive tape.

7. A liquid crystal display device according to claim 5, wherein the double-sided adhesive tape is continuously arranged over a region ranging from the upper surface of the small substrate to the large substrate along two opposing sides of the thermocompression bonding conductive tape.

* * * * *